United States Patent
Provine et al.

(10) Patent No.: US 10,633,253 B1
(45) Date of Patent: Apr. 28, 2020

(54) METHOD FOR CARBON NANOTUBE PURIFICATION

(71) Applicant: Aligned Carbon, Inc., San Jose, CA (US)

(72) Inventors: John Provine, San Jose, CA (US); Cara Beasley, San Jose, CA (US); Gregory Pitner, San Jose, CA (US)

(73) Assignee: Aligned Carbon, Inc., Santa Clara, CA (US)

( * ) Notice: Subject to any disclaimer, the term of this patent is extended or adjusted under 35 U.S.C. 154(b) by 0 days.

(21) Appl. No.: 16/545,456

(22) Filed: Aug. 20, 2019

Related U.S. Application Data

(63) Continuation-in-part of application No. 16/191,185, filed on Nov. 14, 2018, now abandoned.

(51) Int. Cl.
   *C01B 32/172*   (2017.01)

(52) U.S. Cl.
   CPC ........ *C01B 32/172* (2017.08); *C01B 2202/22* (2013.01)

(58) Field of Classification Search
   CPC ... C01B 32/17; C01B 32/159; C01B 2202/02; C01B 2202/08; C01B 2202/22; C01B 2202/34; C01B 2202/36; B82Y 40/00
   See application file for complete search history.

(56) References Cited

U.S. PATENT DOCUMENTS

| | | | |
|---|---|---|---|
| 5,147,741 A | 9/1992 | Araps et al. | |
| 2013/0251618 A1 | 9/2013 | Li et al. | |
| 2013/0252405 A1* | 9/2013 | Li | H01L 21/02606 438/478 |
| 2016/0133843 A1* | 5/2016 | Rogers | H01L 51/0048 257/9 |

OTHER PUBLICATIONS

Definition of "monomer," accessed online at https://www-merriam-webster.com/dictionary/monomer on Jul. 19, 2019. (Year: 2019).
Definition of "polymer," accessed online at https://www.merriam-webster.com/dictionary/polymer on Jul. 19, 2019. (Year: 2019).
F. Du et al., "Laser-induced Nanoscale Thermcapillary Flow for Purification of Aligned Arrays of Single-Walled Carbon Nanotubes", ACS Nano, vol. 8, No. 12, pp. 12641-12649, 2014.
M. Ichida et al., "Absorption spectra of high purity metallic and semiconducting single-walled carbon nanotube thin films in a wide energy region", Solid State Communications, 151 (2011) 1696-1699.
Shulaker et al, "Efficient metallic carbon nanotube removal for highly scaled technologies," IEDM 2015.
(Continued)

*Primary Examiner* — Daniel C. McCracken
(74) *Attorney, Agent, or Firm* — Jeffrey Schox; Samuel Rosenthal

(57) ABSTRACT

A method for carbon nanotube purification, preferably including: providing carbon nanotubes; depositing a mask; and/or selectively removing a portion of the mask; and optionally including removing a subset of the carbon nanotubes and/or removing the remaining mask.

21 Claims, 9 Drawing Sheets

(56) References Cited

OTHER PUBLICATIONS

TCI America: Alpha ,Alpha,Alpha'-Tris(4-hydroxyphenyl)-1-ethyl-4-isopropyl benzene, T 1428-25G, 98.0% (GC), accessed online at https://www.amazon.com/TCI-America-alpha-Tris-4-hydroxyphenyl-1-ethyl-4-isopropylbenzene/dp/B078NHRM7S (Year: 2019).
Zhou et al., Simple Fabrication of Molecular Circuits by Shadow Mask Evaporation, Nano Letters 2003; 3(10): 1371-1374 (Year: 2003).

* cited by examiner

METHOD FOR CARBON NANOTUBE PURIFICATION

CROSS-REFERENCE TO RELATED APPLICATIONS

This application is a continuation-in-part of prior U.S. application Ser. No. 16/191,185, filed on 14 Nov. 2018, which is incorporated in its entirety by this reference.

TECHNICAL FIELD

This invention relates generally to the purification field, and more specifically to a new and useful method for carbon nanotube purification.

BACKGROUND

Typical methods for carbon nanotube purification tend to suffer from one or more limitations. For example, such methods may be unable to preserve the alignment of carbon nanotubes in a sample being purified. Additionally or alternatively, such methods and systems may require surface patterning, use of high temperatures and/or energy expenditure, and/or may leave undesired residues on and/or around the purified carbon nanotubes.

Thus, there is a need in the purification field to create a new and useful method for carbon nanotube purification.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
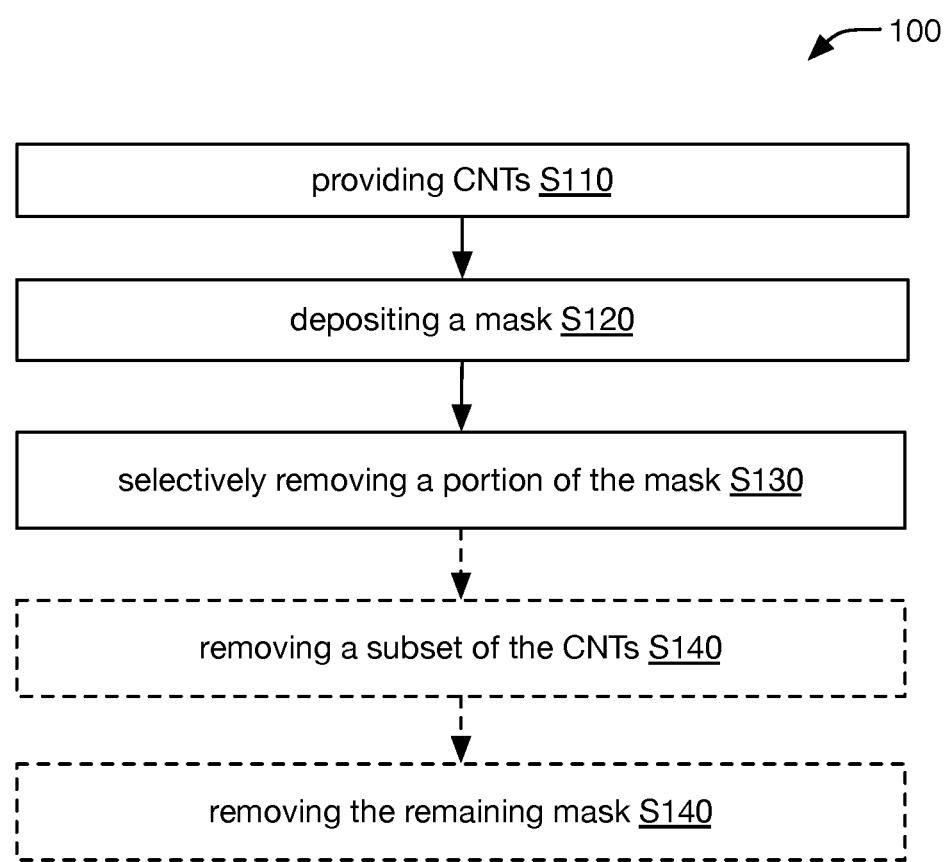
FIG. 1 is a flowchart diagram of an embodiment of the method for carbon nanotube purification.
Figure 2A:
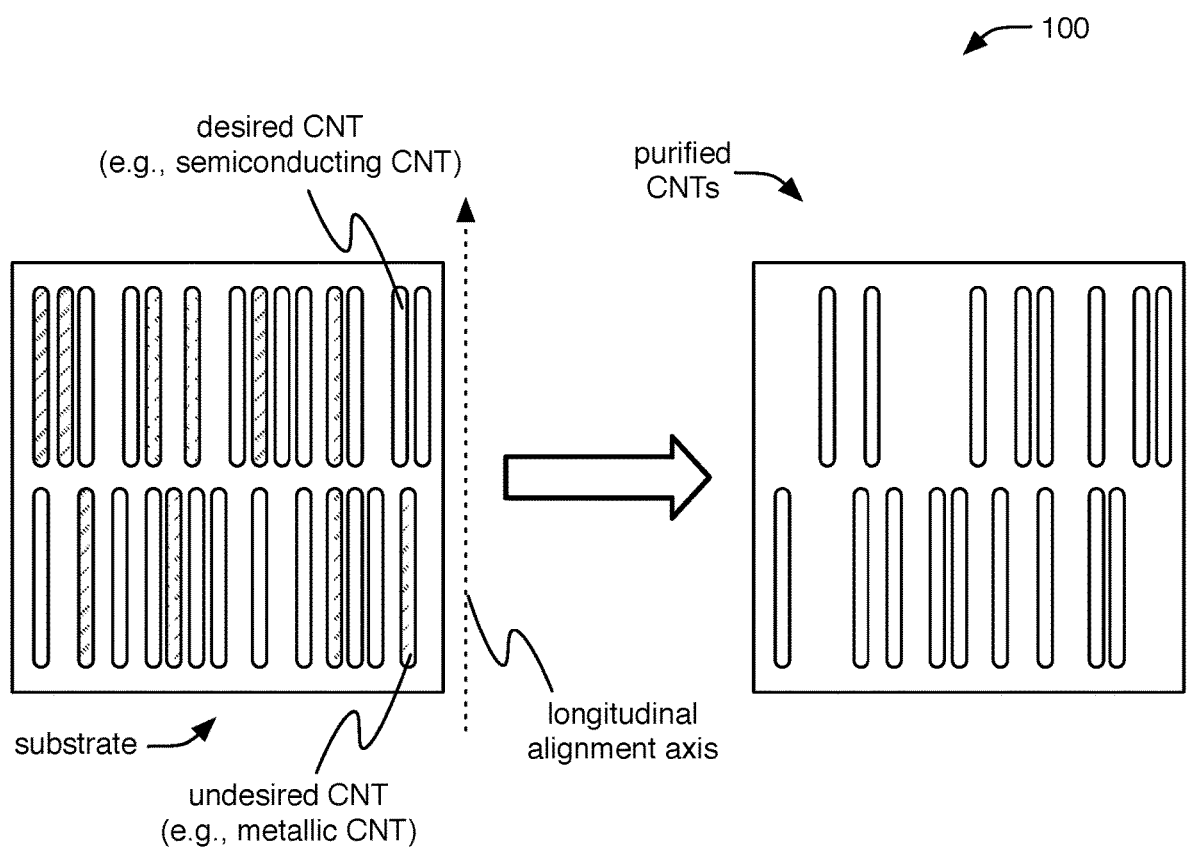
FIG. 2A is a schematic representation of an example of the method, including plan views of a carbon nanotube bed.

A method 100 for carbon nanotube (CNT) purification preferably includes: providing carbon nanotubes S110; depositing a mask S120; and/or selectively removing a portion of the mask S130 (e.g., as shown in FIG. 1). The method 100 can optionally include removing a subset of the carbon nanotubes S140 and/or removing the remaining mask S150. However, the method 100 can additionally or alternatively include any other suitable elements. The method 100 preferably functions to purify a sample of CNTs, such as by isolating a desired population of the CNTs (e.g., by removing all or substantially all undesired CNTs, such as shown in FIG. 2A).

2. Benefits

The method 100 can confer several benefits. First, embodiments of the method 100 can achieve highly-selective purification of CNTs (e.g., resulting in CNTs with purity in excess of 99%, 99.9%, 99.99%, 99.999%, 99.9999%, 99.99999%, or greater). Second, embodiments of the method 100 can enable purification of CNTs (e.g., on arbitrary substrates, such as unpatterned substrates and/or substrates patterned for applications other than enabling the method 100) without perturbing their alignment (e.g., enabling preservation of the alignment of a bed of CNTs). Third, embodiments of the method 100 can be performed at low temperatures and/or with low energy consumption, thereby enabling use of temperature-sensitive substrates and/or reducing energy costs associated with CNT processing. Fourth, embodiments of the method 100 can enable high-throughput purification of CNTs, such as by performing the method 100 using large area, broadband, and/or continuous-wave (CW) illumination. Fifth, embodiments of the method 100 can utilize clean, dry (e.g., liquid-free) processes that result in purified CNTs with minimal (e.g., substantially no) processing residues and/or other contaminants. Sixth, embodiments of the method 100 can exclusively employ materials and processes compatible with CMOS front-end of line requirements. However, the method 100 can additionally or alternatively confer any other suitable benefits.

3. Method 3.1 Providing Carbon Nanotubes.

Providing carbon nanotubes S110 preferably functions to provide the material to be purified. The CNTs can include a mixture of two or more CNT populations, wherein the method 100 preferably functions to isolate one or more such populations from the other(s). The populations can include (e.g., can be discriminated between based on) CNTs having different properties. These properties can include electrical and/or electronic properties (e.g., based on bandgap, electrical resistance, properties arising from and/or associated with chirality, etc.) such as properties along the tube axis, optical properties (e.g., absorption coefficient at one or more wavelengths, absorption spectrum characteristics, etc.), geometrical properties (e.g., diameter, length, chirality, orientation, etc.), thermal properties (e.g., thermal conduction properties, such as lateral, circumferential, and/or axial thermal conductivity, etc.), mechanical and/or acoustic properties (e.g., resonance modes), and/or any other suitable properties. In one example, the CNTs to be purified include two populations defined based on CNT electrical properties (e.g., a metallic population and a semiconducting population), wherein the method 100 functions to remove substantially all of the first CNT population, thereby purifying the second CNT population (e.g., remove the metallic population, resulting in substantially pure semiconducting CNTs). However, the provided material can additionally or alternatively include any other suitable populations of CNTs.

The CNTs are preferably provided as a bed of CNTs, but can additionally or alternatively be arranged in any other suitable manner. The CNTs preferably substantially form a monolayer (or partial monolayer), wherein the bed preferably includes minimal overlap of different CNTs. In particular, it may be desirable to minimize the number of CNTs to be removed (e.g., CNTs of the first CNT population) that are arranged under one or more of the CNTs to be retained (e.g., CNTs of the second CNT population), such as arranged between the CNT(s) to be retained and a substrate, as such an arrangement may reduce the efficacy of the method 100 (e.g., may result in the overlapped CNT of the first CNT population not being removed as intended, due to interference from the overlapping CNT of the second CNT population). However, it may additionally or alternatively be desirable to minimize the number of CNTs to be retained (e.g., CNTs of the second CNT population) that are arranged under one or more of the CNTs to be removed (e.g., CNTs of the first CNT population), as such an arrangement may result in the overlapped CNT of the second CNT population being damaged at and/or near the crossing (e.g., by the CNT removal process of S140). In some embodiments, the CNTs have a crossing density (e.g., number of overlapped CNT regions per unit area) less than a threshold amount (e.g., 1, 2, 5, 10, 15, 20, 25, 35, 50, 70, 100, 200, 500, 1000, 0.1-1, 1-10, 10-20, 15-40, 40-100, 100-300, 300-1000, or 1000-10,000 crossings per square micron, etc.), but can alternatively have any other suitable crossing density and/or arrangement of crossings.

The CNTs are preferably substantially aligned, such having substantially parallel longitudinal axes and/or terminating substantially along one or more lines (e.g., reference lines defined by the CNT ends). In some embodiments, at least a threshold portion of the CNTs (e.g., 99.9, 99.5, 99, 98, 95, 90, 80, 65, 50, 40-65, 65-85, 85-95, 95-99, or 99-100% of the CNTs, etc.) are arranged with their longitudinal axes within a threshold angle (e.g., 0.1, 0.5, 1, 2, 3, 5, 10, 15, 20, 0-1, 1-3, 3-10, 10-30, or 30-45°, etc.) of a reference axis (e.g., longitudinal alignment axis). In one variation, the CNTs include multiple subsets (e.g., spatially separated subsets), wherein each subset is substantially aligned along a different direction (e.g., longitudinal alignment axis). However, the CNTs can alternatively have any other suitable arrangement.

The CNTs (e.g., the bed of CNTs) can have a low, medium, or high density, or have any other suitable density. In some embodiments (e.g., in which the CNTs are provided as grown, in which a single batch of grown CNTs are transferred to another substrate, etc.), the density is less than and/or greater than a threshold linear density (e.g., 0.1, 0.3, 1, 2, 5, 10, 20, 30, 0.001-0.1, 0.1-1, 1-3, 3-10, 10-30, 30-100, or 100-300 CNTs per micron, etc.). In other embodiments (e.g., in which multiple batches of grown CNTs are transferred to a substrate), the density is less than and/or greater than a threshold linear density (e.g., 10, 20, 30, 50, 75, 100, 125, 150, 175, 200, 250, 300, 500, 1000, 0.01-1, 1-10, 10-20, 15-30, 30-50, 50-80, 80-125, 125-175, 175-250, 250-400, 400-600, 600-1000, or 1000-10,000 CNTs per micron, etc.). In a first specific example, the linear density is at least 200 CNTs per micron (e.g., between 200 and 500 CNTs per micron). In a second specific example, the linear density is at least 500 CNTs per micron. However, the CNTs can alternatively have any other suitable density. The linear density is preferably determined with respect to a direction (e.g., within the plane of the substrate) substantially normal to the longitudinal alignment axis, but can additionally or alternatively be determined with respect to any other suitable direction.

The CNTs are preferably single-walled CNTs (SWNTs), but can additionally or alternatively include multi-walled CNTs (MWNTs) and/or any other suitable CNTs. The CNTs preferably have substantially uniform diameters, such as wherein at least a threshold portion of the CNTs (e.g., 99.9, 99.5, 99, 98, 95, 90, 80, 65, 50, 40-65, 65-85, 85-95, 95-99, or 99-100% of the CNTs, etc.) have diameters within a threshold absolute width (e.g., 0.1, 0.2, 0.5, 1, 2, 5, 10, 30, 100, 0.1-0.3, 0.3-1, 1-3, or 3-10 nm, etc.) and/or relative amount (e.g., 0.1, 1, 2, 5, 10, 20, 50, 0-0.1, 0.1-1, 1-2, 2-5, 5-10, 10-20, or 20-50%, etc.) of each other (e.g., difference relative to a mean or median diameter, difference between any two CNTs, etc.), but can alternatively have substantially different diameters and/or any other suitable diameters. The CNT diameters, such as the mean, median, minimum, maximum, first quartile, and/or third quartile diameters, can be 0.3, 0.43, 0.75, 0.9, 1, 1.1, 1.2, 1.3, 1.4, 1.5, 1.6, 1.75, 2, 3, 5, 10, 0.43-0.75, 0.75-1.25, 1-1.5, 1.25-1.75, 1.75-2.5, 2.5-5, 5-10, or 10-30 nm, and/or can be any other suitable diameters. In a specific example, the median diameter is in the range 0.8-1.6 nm (e.g., approximately 1 nm, approximately 1.2 nm, approximately 1.5 nm, etc.).

The CNTs preferably have substantially uniform lengths, such as wherein the lengths of at least a threshold portion of the CNTs (e.g., 99.9, 99.5, 99, 98, 95, 90, 80, 65, 50, 40-65, 65-85, 85-95, 95-99, or 99-100% of the CNTs, etc.) differ by no more than a threshold absolute length (e.g., 1, 10, 100, 200, 500, 1000, 2000, 5000, 10,000, 50,000, 0.1-1, 1-10, 10-100, 100-1000, 1000-10,000, or 10,000-100,000 nm, etc.) and/or relative amount (e.g., 0.1, 1, 2, 5, 10, 20, 0-0.1, 0.1-1, 1-2, 2-5, 5-10, or 10-20%, etc.) from each other and/or from a mean or median length, but can alternatively have substantially different lengths and/or any other suitable lengths. The CNT lengths, such as the mean, median, minimum, maximum, first quartile, and/or third quartile lengths, can be 0.01, 0.1, 0.2, 0.5, 1, 2, 5, 10, 30, 100, 300, 1000, 0.001-0.1, 0.1-1, 1-10, 10-100, 100-1000, or 1000-10,000 microns, and/or can be any other suitable lengths.

The CNTs (e.g., bed of CNTs) are preferably supported by a substrate (e.g., arbitrary substrate), which can function to provide mechanical support for the CNTs and/or facilitate handling and/or processing of the CNTs. The substrate can be a substrate on which the CNTs were grown, onto which the CNTs were transferred, a combination thereof (e.g., wherein a first batch of CNTs are grown on the substrate, and one or more additional batches of CNTs are transferred onto the substrate), and/or any other suitable substrate.

In some embodiments (e.g., in which S120 includes spin coating to deposit the mask), the substrate is preferably substantially smooth (e.g., wherein one or more roughness parameters, such as $R_a$, $R_q$, $R_v$, $R_p$, $R_t$, $R_{sk}$, $R_{ku}$, $R_{zDIN}$, $R_{zJIS}$, $S_a$, $S_q$, $S_z$, etc., is less than a threshold amount, such as 1, 10, 100, 1000, 0-1, 1-10, 10-100, 100-1000, 1000-10,000, or 10,000-100,000 nm roughness, etc.). The substrate is preferably capable of tolerating the temperatures (e.g., 100, 120, 140, 160, 180, 200, 250, 300, 20-60, 60-100, 100-120, 120-140, 140-160, 160-180, 180-200, 200-250, 250-300, or 300-400° C., etc.) used in subsequent elements of the method 100 (e.g., in S130 and/or S150, etc.), such as with substantially no damage to the substrate, but can alternatively not be tolerant of such temperatures. The substrate is preferably not susceptible to the inputs applied in S130 (e.g., not substantially heated directly by the inputs, such as being substantially transparent to the light used to selectively heat the CNTs; being semi-transparent to the light, such as having 0, 0.5, 1, 2, 5, 10, 0-1, 1-5, or 5-20% opacity; being highly reflective of the light, such as wherein the light is incident on the substrate-mask interface at an angle shallower than the interface's critical angle; etc.). In one example, the substrate substantially transparent to the illumination used in S130 and is tolerant of temperatures up to at least 160° C. However, the substrate can additionally or alternatively have any other suitable properties.

The substrate can be single-crystal, poly-crystalline, micro-crystalline, nano-crystalline, amorphous, and/or can have any other suitable microstructure. The substrate can be a wafer (e.g., semiconductor wafer; wafer with a diameter such as 25 mm, 51 mm, 76 mm, 100 mm, 125 mm, 130 mm, 150 mm, 175 mm, 200 mm, 300 mm, 450 mm, etc.), sheet (e.g., glass sheet, such as a sheet of the size corresponding to GEN 1, GEN 2, GEN 3, GEN 3.5, GEN 4, GEN 4.5, GEN 5, GEN 6, GEN 7, GEN 7.5, GEN 8, GEN 9, GEN 10, GEN 10.5, etc.), block, and/or have any other suitable shape. Example substrate materials can include quartz, silicon (e.g., bare, with one or more insulating layers such as an oxide and/or nitride layer, etc.), sapphire, glass (e.g., borosilicate glass, float glass, etc.), plastic, fabric, and/or any other suitable materials. The substrate can be bare (e.g., substantially uniform), patterned (e.g., pre-patterned wafer, finished device (or finished except for the CNTs) such as a display, phone, etc., and/or an element thereof; etc.), and/or have any other suitable features. However, the method 100 can additionally or alternatively include providing the CNTs on any other suitable substrate (and/or without any substrate).

The CNTs and/or substrate preferably include substantially no CMOS-incompatible materials. In a first example, the CNTs and/or substrate include substantially no metals (e.g., no trace contamination by metal, no metal except trace contaminants, etc.). In a second example, the CNTs and/or substrate include substantially no metals except for one or more CMOS-compatible metals (e.g., Al, W, Ti, Ni, Co, Pt, Al, Hf, Ta, Mo, W, Ti, Cr, Zr, Pd, etc.). However, the CNTs and/or substrate can additionally or alternatively include any other suitable materials and/or contaminants.

S1lo can optionally include growing (all or some of) the CNTs (e.g., on the substrate; on a different substrate, such as prior to transfer to the substrate; etc.). For example, S1lo can include performing a patterned growth technique (e.g., as described in U.S. Pat. No. 8,367,035, titled "Methods of making spatially aligned nanotubes and nanotube arrays", which is hereby incorporated in its entirety by this reference), preferably to grow an aligned bed of CNTs. S110 can additionally or alternatively include transferring (all or some of) the CNTs to the substrate, such as by ink jet printing, thermal transfer printing, contact printing, dry transfer printing, screen printing, and/or any other suitable transfer technique (e.g., as described in U.S. Pat. No. 9,748,421, titled "Multiple carbon nanotube transfer and its applications for making high-performance carbon nanotube field-effect transistor (CNFET), transparent electrodes, and three-dimensional integration of CNFETS", which is hereby incorporated in its entirety by this reference). However, S1lo can additionally or alternatively include providing the CNTs in any other suitable manner.

3.2 Depositing a Mask.

Depositing a mask S120 preferably functions to protect and/or encapsulate the CNTs with a patternable material. The mask can be deposited, for example, by spin coating, spray coating, dip coating, evaporation, sputtering, atomic layer deposition, self-assembly, and/or any other suitable deposition technique(s).

Figure 2B:
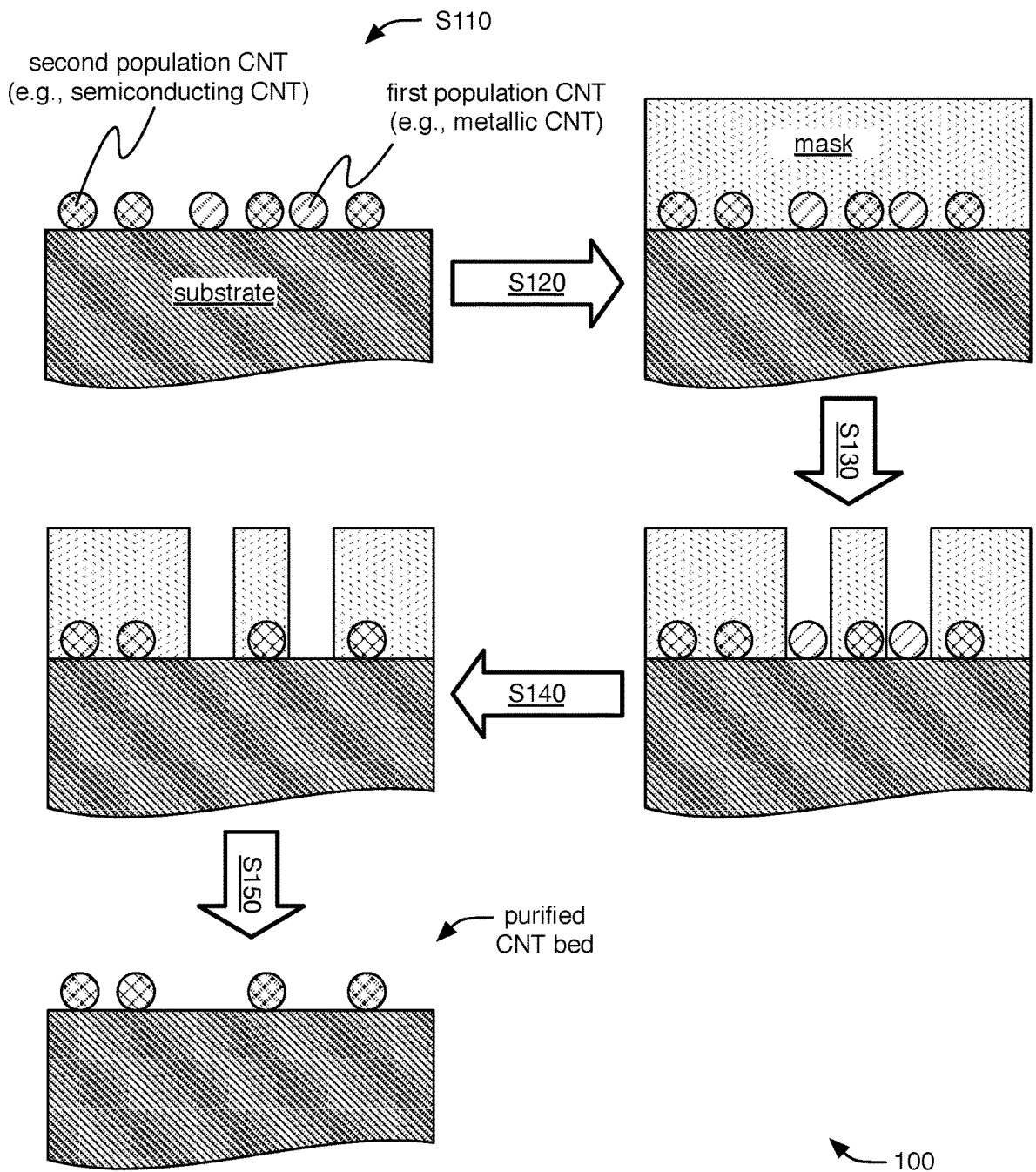
FIG. 2B is a schematic representation of an example of the method, including cross-sectional views of a carbon nanotube bed.
Figure 2C:
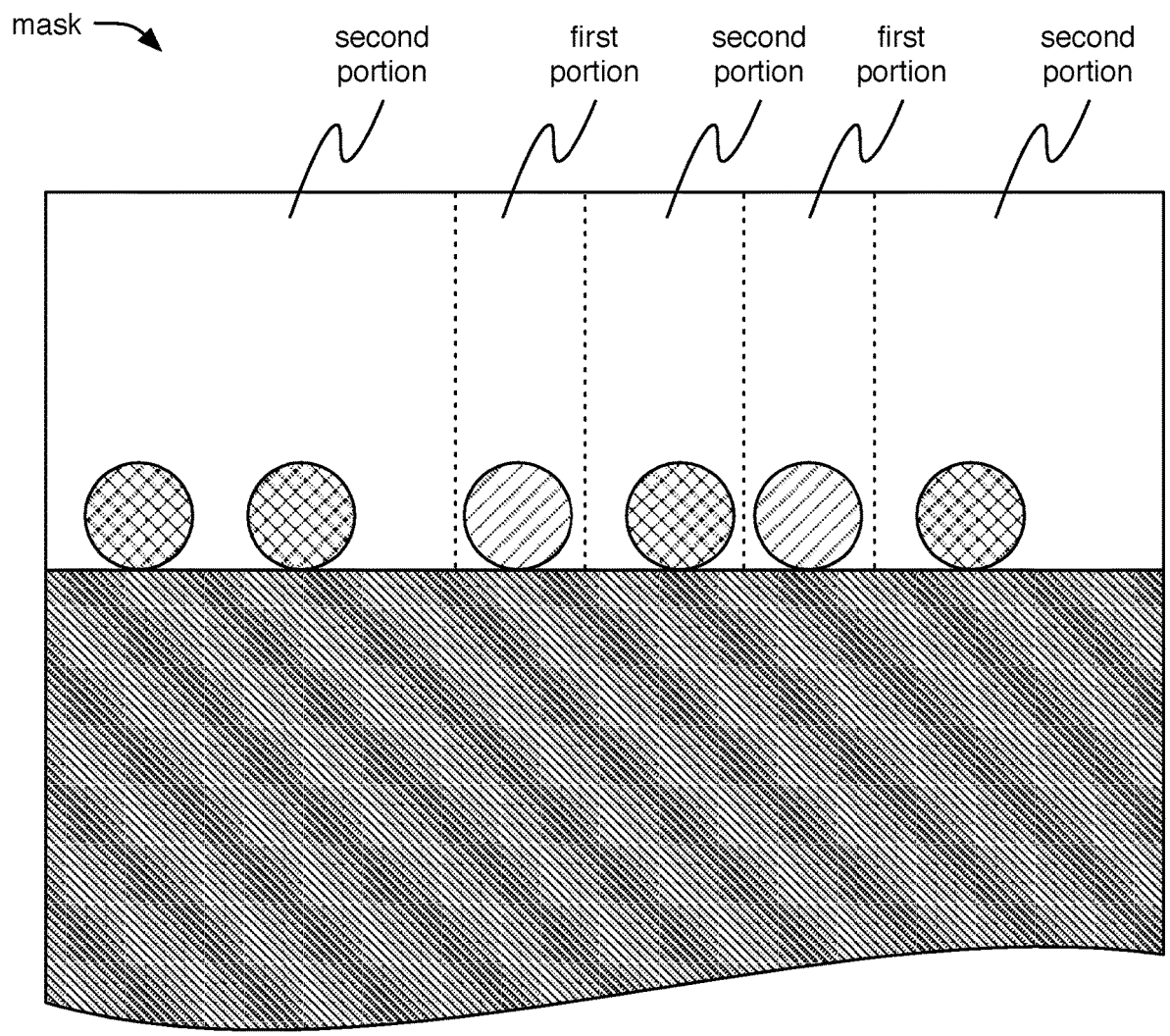
FIG. 2C is a schematic representation of the mask of FIG. 2B.

The mask preferably protects and/or encapsulates (e.g., covers) substantially all of the CNTs (e.g., substantially covers the entire bed of CNTs), but can alternatively protect and/or encapsulate any suitable subset thereof. The mask preferably protects and/or encapsulates CNTs of the different populations (e.g., first and second population, such as described below in more detail) to substantially the same extent, such as wherein a similar (e.g., substantially equal) fraction of each population is protected and/or encapsulated (e.g., covered) by the mask. In embodiments in which the mask includes different portions protecting and/or encapsulating different CNT populations (e.g., a first portion coating the first population and not the second population, and a second portion coating the second population and not the first population), the different portions of the mask are preferably defined by their spatial relationships with the various populations (e.g., each portion is defined as the subset of the mask that covers the corresponding CNT population, such as shown by way of example in FIG. 2C), rather than by any other characteristics. The different portions preferably have substantially the same characteristics aside from their spatial relationships with the various populations (e.g., the different portions, preferably along with the rest of the mask, cooperatively form a substantially uniform, substantially continuous layer). For example, the different portions preferably include the same material(s) deposited by the same deposition process and are preferably deposited at the same time (e.g., the first and second portions are deposited concurrently in the same deposition process). The mask preferably does not include any lateral patterning corresponding to differing locations of CNTs of the different populations. In some such examples, in the absence of the CNTs, it would not be possible to discriminate between different portions of the mask (e.g., it would not be possible to determine the boundaries of any particular portion of the mask, nor to determine, for any particular location on the mask, which portion that location is associated with).

The mask (e.g., after deposition) is preferably made substantially of a single material (e.g., at least 75% purity, 90% purity, 95% purity, 99% purity, 99.9% purity, etc.; including or excluding one or more substances, such as solvents, associated with mask deposition), but can alternatively include multiple materials. The mask material is preferably operable to be deposited (e.g., easily deposited) in a thin, uniform layer, but can additionally or alternatively have any other suitable deposition characteristics. The material is preferably a polymer, but can additionally or alternatively include small organic molecules, metals, semiconductors, ceramics, and/or any other suitable materials. The mask is preferably not susceptible to the inputs applied in S130 (e.g., not substantially heated directly by the inputs, such as being substantially transparent to the light used to selectively heat the CNTs).

The mask (e.g., all or some of the mask) is preferably in thermal contact with the CNTs. For example, the mask can form a layer (e.g., coating, such as a conformal coating) on and between the CNTs (e.g., on the exposed substrate between the CNTs). The mask is preferably substantially uniform (e.g., uniform thickness, such as uniform conformal coating thickness or uniform distance from the substrate to the top of the mask layer; uniform composition, such as laterally uniform across the substrate or a portion thereof; etc.) but can alternatively have any suitable nonuniformities. The mask is preferably thick enough to protect the CNTs that it covers (e.g., during S140), but preferably thin enough to enable formation (e.g., during S130) of thin trenches (e.g., less than a threshold width, such as 1, 2, 5, 8, 10, 12, 15, 20, 0-1, 1-5, 5-15, 15-20, or 20-35 nm wide), which can enable high selectivity (e.g., avoiding inadvertent exposure of CNTs of the wrong population) and/or reduce the energy needed to perform the method 100 (e.g., to perform S130 and/or S150). For example, the mask can be thinner than a first threshold thickness (e.g., 2, 5, 8, 10, 12, 15, 20, 30, 50, 1-5, 5-15, 15-20, 20-30, 30-50, or 50-100 nm) and/or thicker than a second threshold thickness (e.g., 0.5, 1, 2, 5, 8, 10, 12, 15, 20, 0-1, 1-5, 5-15, 15-20, or 20-35 nm). However, the mask can additionally or alternatively have any other suitable thickness.

The mask is preferably susceptible to decomposition (e.g., depolymerization) in response to one or more stimuli (e.g., includes one or more stimuli-responsive, depolymerizable, low ceiling temperature polymers). The stimulus is preferably a heat-related stimulus such as a temperature increase (e.g., increase to above a threshold temperature, such as 30, 40, 600, 80, 100, 120, 140, 160, 180, 200, 250, 300, 20-60, 60-100, 100-120, 120-140, 140-160, 160-180, 180-200, 200-250, 250-300, or 300-400° C., etc.), but can additionally or alternatively be any other suitable stimulus. The material decomposition process is preferably a clean process (e.g., leaves minimal or substantially no residue), such as a process that does not require subsequent removal of material residue (e.g., by etching, washing with one or more solvents, etc.). For example, the decomposition process can be a depolymerization process, producing monomers (e.g., volatile monomers) that leave the CNTs (e.g., vaporize, are pumped away, etc.). However, the material can additionally or alternatively have any other suitable characteristics.

A person of skill in the art will recognize that depolymerization is the process of decomposing a polymer into its constituent monomers and/or constituent oligomers. The products of depolymerization can be mostly (e.g., all, substantially all such as more than 90%, 95%, 98%, 99%, 99.9%, 99.99%, etc.) the constituent monomers, but can additionally or alternatively include constituent oligomers (e.g., include a mixture of monomers and oligomers, include substantially only oligomers, etc.). The constituent oligomers can include oligomers with any suitable number of repeat units (e.g., 2, 3, 4, 5, 6-10, 10-20, and/or 20-50 repeat units, etc.). The products of depolymerization preferably consist essentially of the constituent monomers and/or constituent oligomers. The constituent monomers produced by depolymerization are preferably the monomers associated with the repeat units and/or structural units of the polymer that was depolymerized (e.g., the monomers are molecular analogs of the repeat units and/or structural units). In some examples, in which the polymer includes multiple structural units of different types (e.g., in a polymer, such as a condensation polymer, formed from a plurality of monomer species), depolymerization can produce multiple types of constituent monomers (e.g., associated with the structural units, such as being the plurality of monomer species from which the polymer was formed or a subset thereof) and/or constituent oligomers, or can produce a single type of constituent monomer (e.g., associated with the repeat units) and/or constituent oligomer. In some examples, depolymerization includes an unzipping process ("unzipping depolymerization"), in which the depolymerization occurs by a sequence of reactions progressing along a polymer (e.g., beginning from one end of the polymer, progressing monomer-by-monomer, etc.) to yield constituent monomers (and/or constituent oligomers). A person of skill in the art will further recognize that depolymerization is an example of polymer decomposition, and that polymers can undergo many other decomposition processes (e.g., pyrolysis, gasification, solvolysis, etc.), all of which are distinct from depolymerization. For example, in contrast with depolymerization, pyrolysis typically produces an assortment of small molecules (not limited to the constituent monomers and/or constituent oligomers of the polymer) and carbonaceous residue.

In some embodiments, the material is (or includes) a stimulus-responsive polymer, which is a polymer configured to decompose, preferably by depolymerization, in response to a trigger event. Such polymers can include self-immolative polymers, which are polymer chains stabilized by one or more trigger groups (e.g., end caps). In the absence of the trigger group(s), the polymer chain decomposes (e.g., depolymerizes, preferably via unzipping depolymerization beginning from the end at which the trigger group would be present in order to stabilize the polymer) when above a threshold temperature, typically a low temperature (e.g., in the range of −60° C. to 0° C., such as −20° C. to −40° C.). The trigger group(s) can function to prevent this decomposition when they are bound to the polymer chain (e.g., at one or more ends of the chain); upon loss of the trigger group, such as due to trigger group cleavage and/or decomposition (e.g., in response to the stimulus, such as in response to reaching a temperature above a threshold such as 100-180° C.), the polymer chain preferably undergoes decomposition (e.g., depolymerization, preferably unzipping depolymerization), such as described above. In one example, in which the material includes a self-immolative polymer, the trigger group is an end cap such as trichloroacetyl isocyanate (TCAI), azobenzene, chloroformate, or acetic anhydride.

The self-immolative polymers (e.g., with end cap(s) and/or other trigger group(s), such as described above) can include, for example, poly(N-isopropyl acrylamide), poly(N-ethylpyrrolidine methacrylate), poly(phthalaldehyde), poly(4,5-dichlorophthalaldehyde), poly(methyl glyoxylate), poly(carbamate), polyurethane, polycarbonate, and/or poly(benzyl ether), or a combination of multiple such materials. The polymer chain can be branched, linear, cyclic, and/or have any other suitable configuration. The polymer chain can be between 10-1,000 nm long, or have any suitable length. The polymers units in the mask preferably have similar and/or substantially identical properties, but can alternatively be variable. However, the mask can additionally or alternatively include any other suitable polymers and/or other materials.

The mask preferably includes substantially no CMOS-incompatible materials. In a first example, the mask includes substantially no metals (e.g., no trace contamination by metal, no metal except trace contaminants, etc.). In a second example, the mask includes substantially no metals except for one or more CMOS-compatible metals (e.g., Al, W, Ti, Ni, Co, Pt, Al, Hf, Ta, Mo, W, Ti, Cr, Zr, Pd, etc.). However, the mask can additionally or alternatively include any other suitable materials and/or contaminants.

However, the mask can additionally or alternatively include any other suitable material(s), have any other suitable characteristics, and/or can be deposited in any other suitable manner.

3.3 Selectively Removing a Portion of the Mask.

Selectively removing a portion of the mask S130 preferably functions to pattern the mask (e.g., based on proximity to CNTs of one or more populations, thereby enabling discrimination between the CNT populations). The mask portion is preferably removed by decomposition (e.g., depolymerization), such as described above (e.g., regarding S120), but can additionally or alternatively be removed in any other suitable manner. The removed mask portion preferably leaves substantially no residue and/or other contamination (e.g., on the CNTs, on the substrate, etc.). For example, the decomposition products (e.g., volatile monomers formed by depolymerization) can be pumped away from the CNTs. S130 can be performed in an ambient environment (e.g., air), inert environment (e.g., nitrogen, argon, etc.), vacuum environment (e.g., partial vacuum such as negative pressure environment, rough vacuum, high vacuum, ultra high vacuum, etc.), and/or any other suitable environment.

S130 preferably includes removing the mask portion ("first mask portion") covering (e.g., coating) the first CNT population (e.g., population to be removed), and preferably includes not removing (and/or minimizing the removal of) the mask portion ("second mask portion") covering (e.g., coating) the second CNT population (e.g., population to be retained). However, S130 can additionally or alternatively include removing the mask portion covering any other CNT population(s), and/or removing any other suitable portions of the mask.

Removing the first mask portion preferably exposes all or some of each CNT of the first CNT population (or a substantial fraction thereof, such as at least 90, 99, 99.9, 99.99, 99.999, 99.9999, or 99.99999% of the CNTs of the first CNT population), such as exposing at least a minimum threshold fraction and/or at most a maximum threshold fraction of the tube width of each such CNT (e.g., 1, 2, 5, 10, 20, 30, 40, 50, 60, 70, 80, 90, 95, 98, 99, 100, 0-1, 1-10, 10-30, 30-60, 60-80, 80-90, 90-95, 95-99, or 99-100% of the tube width) and/or exposing a region extending past the tube width on one or both sides (e.g., extending by at least a minimum threshold fraction and/or at most a maximum threshold fraction, such as 1, 2, 5, 10, 20, 30, 40, 50, 60, 70, 80, 90, 95, 98, 99, 100, 0-1, 1-10, 10-30, 30-60, 60-80, 80-90, 90-95, 95-99, or 99-100% of the tube width). In some embodiments, S130 includes opening a trench over and/or around each CNT of the first CNT population (or substantially all such CNTs); example shown in FIG. 2B. Each trench preferably has a width (e.g., mean width, median width, minimum width, maximum width, etc., along its length or a portion thereof) such as described above (e.g., regarding the minimum and/or maximum threshold fractions of tube width to expose; regarding S120, such as regarding the mask thickness; etc.). In one example (e.g., in which all or some of the CNTs have widths in the range of 1-1.5 nm), all or some of the trenches have widths of 0.5-20 nm, preferably 1-10 nm (e.g., 1, 2, 3, 5, 7.5, 10, 1-2, 2-5, or 5-10 nm). However, the trenches can additionally or alternatively have any other suitable widths.

Figure 3A:
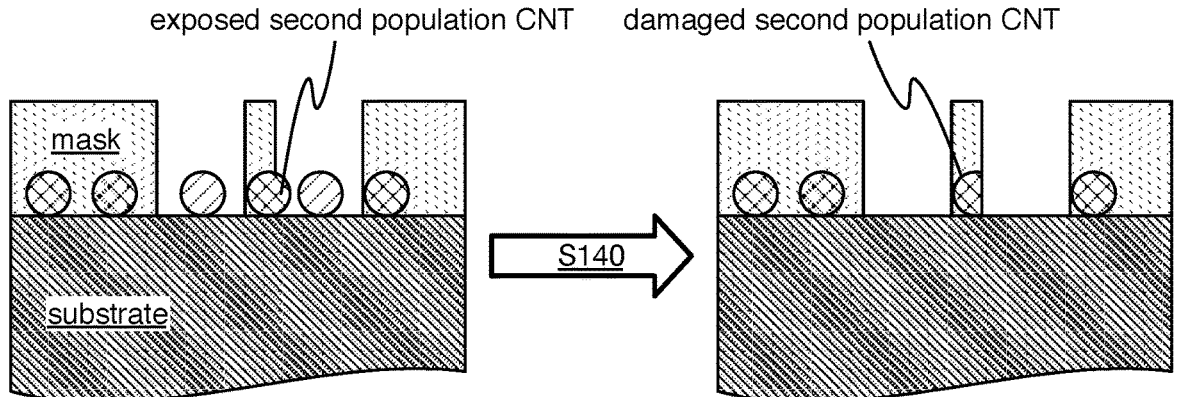
FIGS. 3A-3C are schematic representations of variations of elements of the method.
Figure 3B:
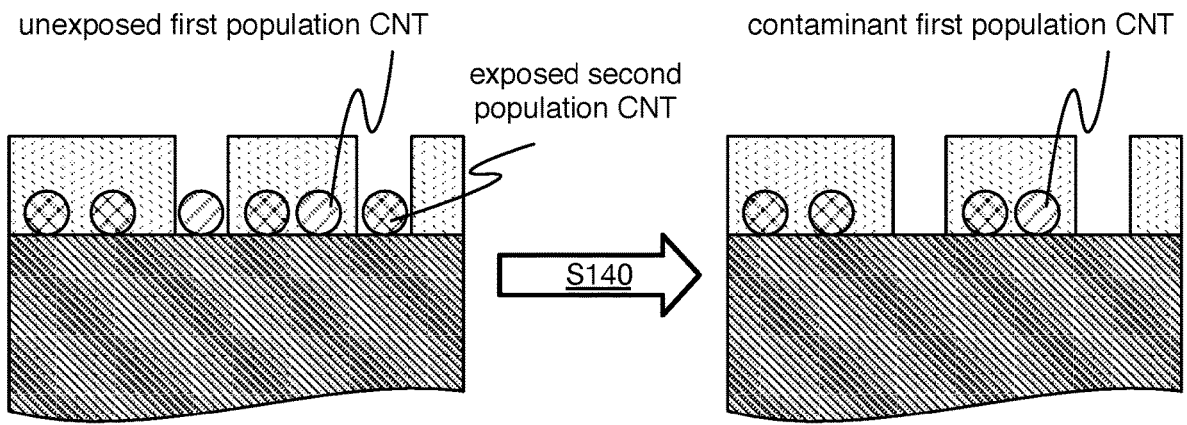
Figure 3C:
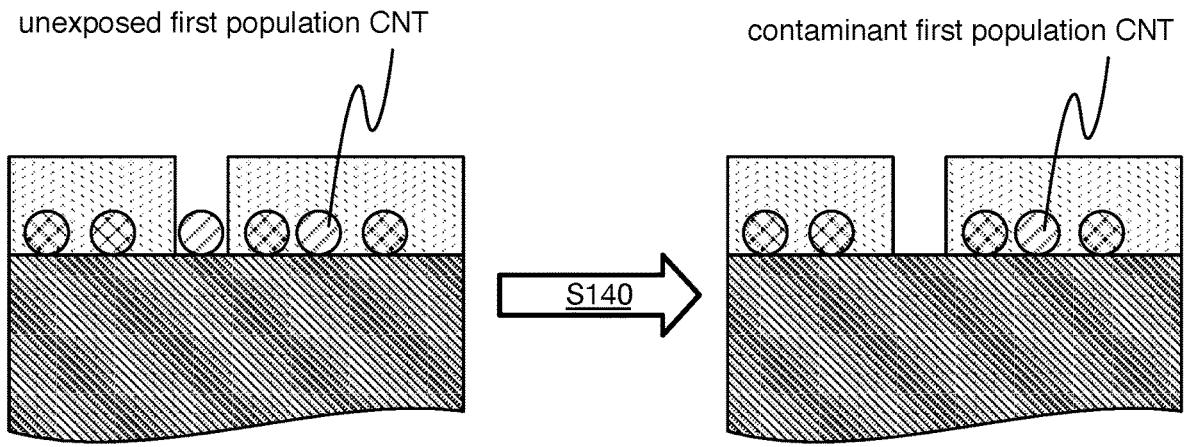

Selectively removing a portion of the mask S130 preferably does not result in (or minimizes the occurrence of) one or more undesired mask configurations. A first example of an undesired mask configuration includes opening a trench extending excessively past the width of a first population CNT (e.g., extending significantly more than necessary to enable S140), such that the trench also exposes one or more second population CNTs, which can result in damage to and/or removal of the exposed second population CNTs (e.g., as shown in FIG. 3A). A second example of an undesired mask configuration includes exposing (e.g., opening a trench over) a second population CNT (e.g., rather than and/or in addition to over a first population CNT), which can result in damage to and/or removal of the exposed second population CNT (e.g., as shown in FIG. 3B). A third example of an undesired mask configuration includes failing to expose (e.g., open a trench over) a first population CNT, which can result in failure to remove the unexposed first population CNT (e.g., as shown in FIGS. 3B-3C).

However, S130 can additionally or alternatively include avoiding and/or minimizing any other suitable undesired mask configurations, or can include no such avoidance and/or minimization.

S130 preferably includes selectively heating one or more target CNT populations S131 (e.g., preferentially heating the first CNT population, such as heating the first CNT population more than the second CNT population). S131 preferably results in heat transmission to regions of the mask near the target CNTs (e.g., to the first mask portion), thereby elevating the temperature of the heated regions above the mask's decomposition temperature (e.g., above the temperature at which the trigger groups no longer stabilize the stimulus-responsive polymer of the mask, thereby causing depolymerization) and causing those regions to decompose. However, S131 preferably does not result in significant heat transmission (e.g., sufficient to cause mask decomposition) to regions of the mask near untargeted CNTs (e.g., due to undesired heating of the untargeted CNTs, due to heat transmission from the target CNTs, etc.), thereby avoiding decomposition of those regions (e.g., the second mask portion). Thus, S131 preferably includes a substantial difference in the heating rate between the target CNT populations and the untargeted CNTs (e.g., more than a threshold ratio, such as 1.1, 1.5, 2, 3, 5, 10, 20, 1-1.2, 1.2-2, 2-5, 5-10, 10-20, or 20-50 times greater heating of the target CNT populations).

Figure 4:
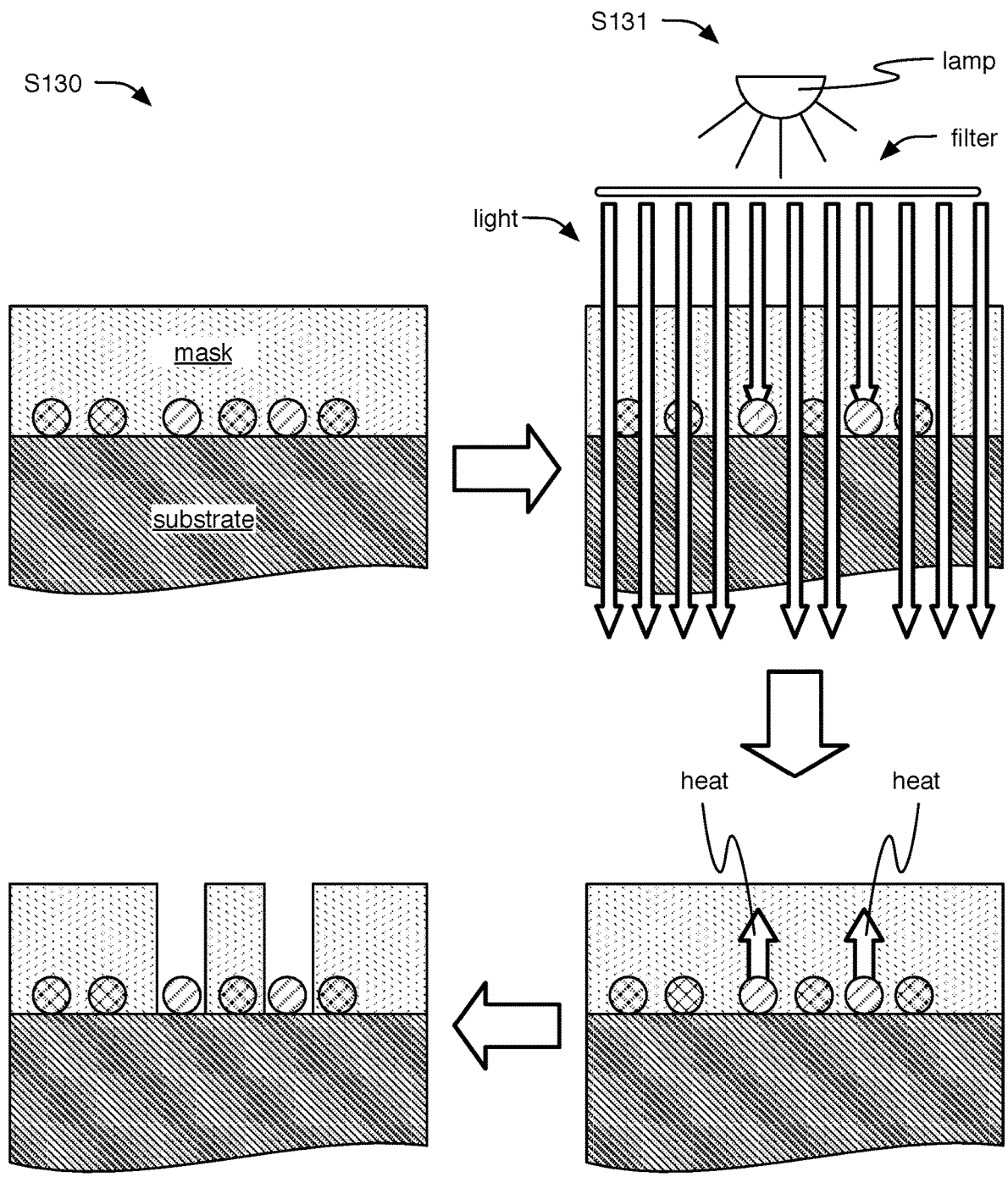
FIG. 4 is a schematic representation of an element of the method.
Figure 5A:
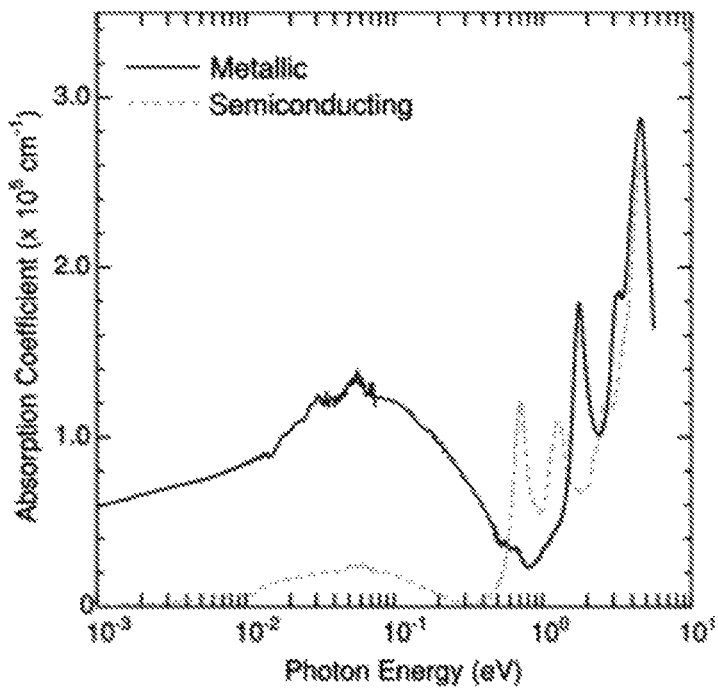
FIGS. 5A-5D are representations of optical absorption coefficients of carbon nanotubes in various wavelength ranges.
Figure 5B:
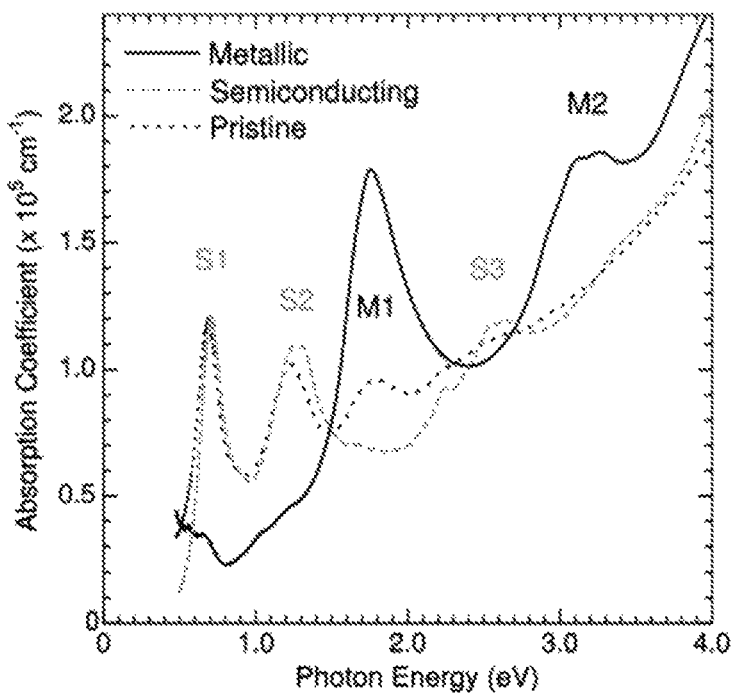
Figure 5C:
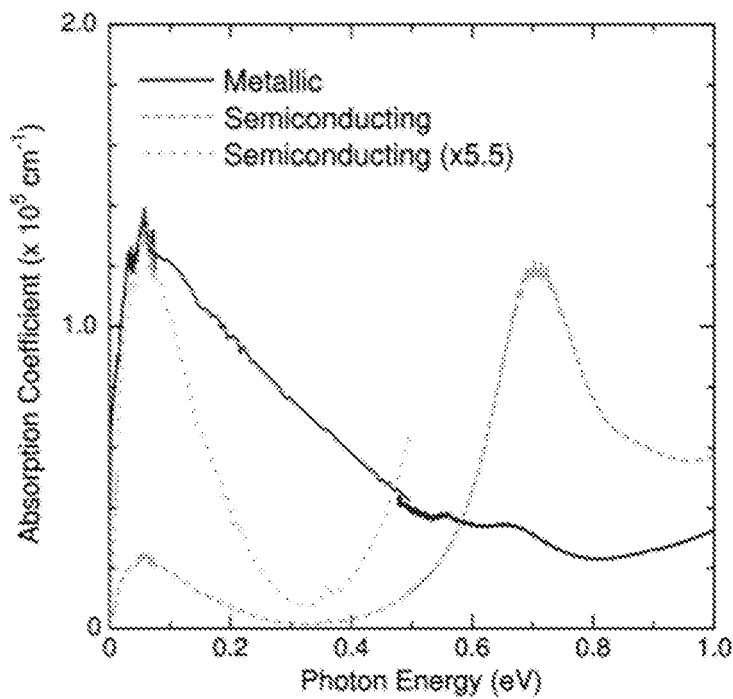
Figure 5D:
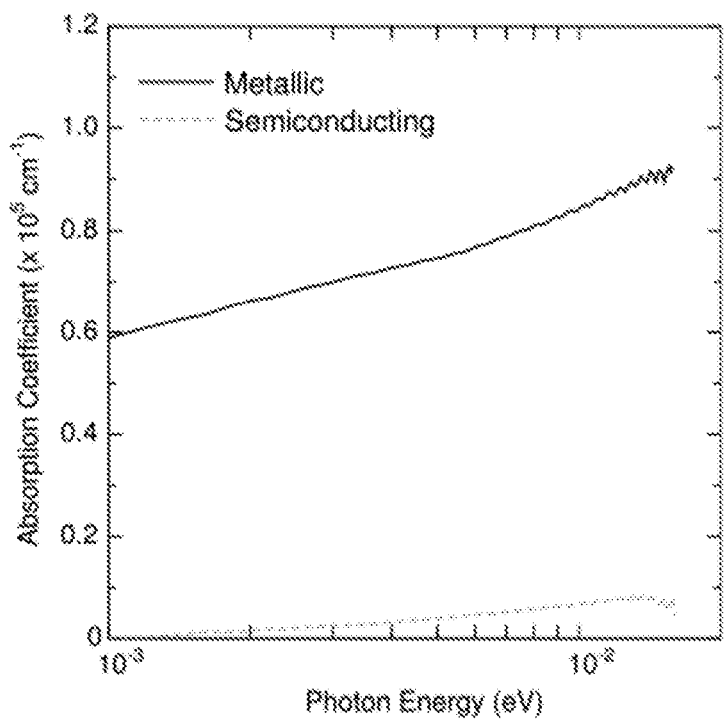

S131 preferably includes heating the target CNT populations optically (e.g., due absorption of an optical input), more preferably by illuminating the CNTs with light that is preferentially absorbed by the target CNT populations (e.g., absorbed more strongly, preferably significantly more strongly, by first population CNTs than by second population CNTs), such as shown in FIG. 4. This preferential absorption preferably arises from a difference in absorption coefficients (associated with the light of the optical input) between CNTs of the first and second populations (e.g., wherein CNTs of the first population have a greater absorption coefficient than CNTs of the second population), but can additionally or alternatively arise from any other suitable phenomena.

In one embodiment, in which the populations include a metallic CNT population and a semiconducting CNT population, the S131 includes illuminating the CNTs using one or more wavelength bands that are preferentially absorbed by either metallic or semiconducting CNTs (e.g., wavelengths such as shown in FIGS. 5A-5D and/or as described in "Absorption spectra of high purity metallic and semiconducting single-walled carbon nanotube thin films in a wide energy region", Masao Ichida et al., Solid State Communications, 151 (2011) 1696-1699, which is hereby incorporated in its entirety by this reference). In a first variation, in which the first CNT population (population to be heated) is the metallic CNT population, the illumination can include one or more bands in the IR range 2-4 microns (e.g., in the range 3-4 microns), the visible range 500-800 nm (e.g., in the range 600-750 nm), in the visible/UV range 300-450 nm (e.g., in the range 365-425 nm), in one or more THz ranges (e.g., 60 microns or longer, such as in the range 60-1250 microns), and/or any other suitable bands. In a second variation, in which the first CNT population is the semiconducting CNT population, the illumination can include one or more bands in the IR range 0.8-2 microns (e.g., in the range 0.9-1.9 microns) and/or any other suitable bands.

The illumination preferably includes one or more wide bands (e.g., bands having a wavelength bandwidth greater than a threshold value, such as 5, 10, 20, 50, 100, 200, 500, 750, 1000, 1500, 2000, 1-5, 5-25, 25-100, 100-300, 300-

1000, 1000-3000, or 3000-30,000 nm, etc.), but can additionally or alternatively include narrow bands (e.g., bandwidth less than the threshold value, substantially monochromatic, etc.) and/or any other suitable illumination.

The illumination can be incident on the CNTs from a direction parallel, normal, and/or at an oblique angle (e.g., glancing, such as within 5° of parallel; slightly off-normal, such as within 5° of normal; substantially oblique, such as 10, 15, 30, 45, 60, 75, 80, 5-10, 10-20, 20-40, 40-50, 50-70, 70-80, or 80-85°, etc.) to the substrate and/or the longitudinal alignment axis.

The illumination preferably has an intensity in the range of milliwatts per square centimeter to watts per square centimeter (e.g., 1-3, 3-10, 10-20, 20-50, 50-100, 100-300, 300-1000, 1000-3000, or 3000-30,000 mW/cm$^2$, etc.), but can alternatively have a lower or higher intensity. In one example, the illumination intensity is in the range 10-30 mW/cm$^2$. The illumination is preferably continuous wave (CW) illumination, but can additionally or alternatively include pulsed illumination and/or any other suitable temporal variation in illumination. The CNT bed can be illuminated for a time period of seconds (e.g., 1, 2, 5, 10, 25, 60, 0.5-3, 3-20, or 20-60 s), minutes (e.g., 1, 2, 3, 5, 10, 1-3, or 3-10 minutes), or any other suitable length of time.

The illumination preferably originates from a broadband light source (e.g., emitting light due to thermal radiation) such as a lamp. For example, a system for illuminating the CNT bed can include a broadband light source, one or more optical elements (e.g., lenses, mirrors, etc.) that can function to focus light from the source onto the CNT bed, and/or one or more optical filters that can function to select the appropriate band(s) of light for illumination (e.g., as described above). In this example, some variations of the system can be easily reconfigured for different illumination conditions (e.g., using different wavelength bands, such as to target different CNT populations), such as by replacing one or more of the filters. However, the illumination can additionally or alternatively originate from one or more narrowband and/or monochromatic light sources, such as LEDs and/or lasers (e.g., bar diode, point source, etc.), and/or from any other suitable light sources.

S131 can additionally or alternatively include heating the target CNT populations using one or more inputs such as electrical inputs (e.g., DC, AC), radio wave inputs (e.g., microwave), acoustic inputs, and/or mechanical inputs. In a first example, the CNT bed is supported by a substrate that includes electrical contacts, such as a first electrical contact in contact with a first end of CNTs of an aligned array, and a second electrical contact in contact with the opposing end of those CNTs. In this example, an electrical bias is applied between the two electrical contacts, thereby causing current to flow through the contacted CNTs, wherein significantly more current flows through each metallic CNT than through each semiconducting CNT, thereby causing resistive heating of the metallic CNTs. In a variation of this example, a bias is also applied to a gate electrode (e.g., patterned on the substrate, opposing the substrate across the CNT bed, such as on top of and/or integrated with the mask, etc.), which is preferably capacitively coupled to the CNT bed (e.g., to the semiconducting CNTs of the bed), thereby reducing and/or preventing current flow through the semiconducting CNTs. In a second example, the CNT bed is supported by a substrate that includes one or more antennas (e.g., microwave antennas) that can function to couple incident radiation (e.g., radio waves, such as microwaves) into the CNT bed, thereby inducing a current in the CNTs (e.g., preferentially in the metallic CNTs). In this example, radiation resonant with the antenna(s) is transmitted toward the antennas, thereby inducing current in CNTs, causing preferential heating of the metallic CNTs (e.g., as described above regarding the first example). In a third example, an acoustic and/or mechanical input is supplied to the CNT bed, wherein the input includes one or more frequencies that are resonant with CNTs of the first population (e.g., wherein the populations are determined based on acoustic and/or mechanical properties), thus causing the first population CNTs to preferentially absorb energy from the input, which is subsequently dissipated as heat.

The energy input (e.g., illumination) is preferably incident on a large area (e.g., the entire CNT bed; a portion thereof, such as more than 1, 2, 5, 10, 20, 25, 30, or 50%; etc.) at once, but can alternatively be incident on a region of any suitable size. In a first example, the energy input is incident on the entire CNT bed, and S131 can be performed by directing energy to (e.g., illuminating) the entire CNT bed, preferably until the desired temperature increase has been achieved in the first mask portion. In a second example, the energy input is incident on only a subset of the CNT bed, and S131 can be performed by moving the energy input location and/or the CNT bed (e.g., rastering the energy input to cover the entire CNT bed), such as by completing mask removal in each region before moving to the next, or by rapidly moving between regions (e.g., to achieve concurrent mask removal in multiple such regions).

However, S131 can additionally or alternatively include using any other suitable energy input in any suitable manner.

S130 can optionally include causing additional heating (e.g., uniform heating) of all the CNTs (e.g., across the entire CNT bed and/or substrate). For example, S130 can include heating the CNT bed (e.g., using an oven, hot plate, and/or other heat source) to a substantially uniform temperature below the mask decomposition temperature (e.g., 1, 2, 5, 10, 15, 20, 25, 0-3, 3-10, 10-20, or 20-50° C. below), but preferably above the ambient temperature (e.g., 18-22° C.). Thus, the selective heating required in S131 can be significantly reduced (e.g., requiring a mask temperature increase of 5-20° C. rather than 50-200° C.), which can reduce the needed power and/or dwell time associated with S131. In a specific example, in which the mask decomposition temperature is approximately 140° C., S130 includes heating the substrate, CNT bed, and mask to approximately 130° C., and then performing S131 (e.g., illuminating the CNT bed with light preferentially absorbed by the first population) to elevate the temperature of the first mask portion above 140° C. while preventing the second mask portion from reaching or exceeding 140° C. (e.g., by continuing to maintain an overall or average temperature of approximately 130° C.).

However, S130 can additionally or alternatively include selectively removing a portion of the mask in any other suitable manner.

3.4 Removing a Subset of the Carbon Nanotubes.

Removing a subset of the carbon nanotubes S140 preferably functions to purify the CNTs.

S140 preferably includes removing the exposed CNTs (e.g., first CNT population, CNTs near the first mask portion, etc.). Removing the exposed CNTs preferably includes removing substantially all of the exposed CNTs (e.g., more than a threshold fraction, such as 99, 99.9, 99.99, 99.999, 99.9999, or 99.99999%, etc.). Each removed CNT is preferably substantially entirely vaporized (e.g., wherein the vaporized material is pumped away from the CNT bed), and preferably leaves substantially no conductive residue and/or other residue on the CNT bed, mask, and/or substrate.

Figure 6:
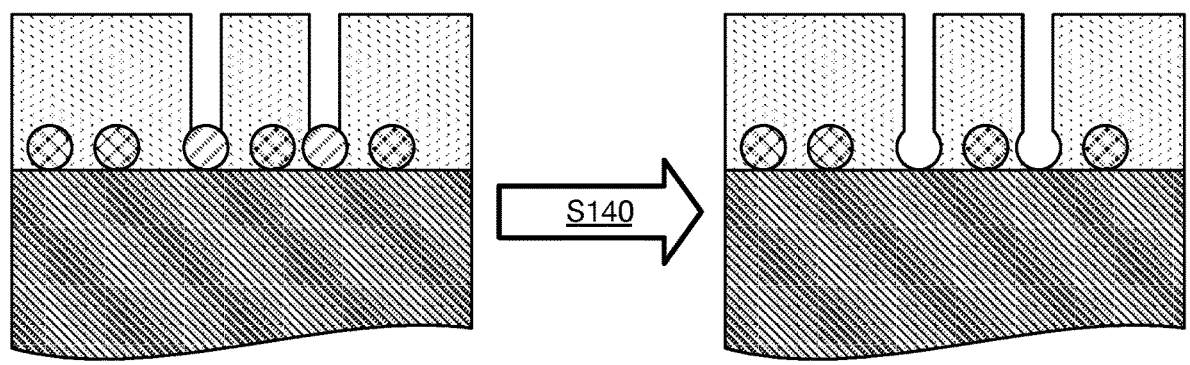
FIG. 6 is a schematic representation of a variation of elements of the method.

The exposed CNTs are preferably removed by one or more etching processes. The etching process(es) preferably remove (e.g., destroy) the exposed CNTs without etching through the mask (e.g., without exposing the previously-unexposed CNTs, such as the second CNT population). In some embodiments, in which the mask layer thickness is significantly greater than the CNT diameter (e.g., a 5-20 nm mask thickness compared to a 1-1.5 nm CNT diameter), even substantially non-selective etching processes and/or some etching processes that etch the mask more quickly than the CNTs can be tolerated (e.g., as a small CNT will still be destroyed before the etching process removes the entire mask thickness). S140 can optionally include etching partially-exposed CNTs. For example, if the trench width is less than the CNT diameter, the etch process can (and preferably does) undercut to remove the entire CNT (e.g., as shown in FIG. 6). The etching processes can include, for example, oxygen plasma etching, UV-ozone etching, physical etching (e.g., argon ion milling), chemical etching (e.g., vapor-phase etching, wet etching, etc.), and/or any other suitable etching processes. However, the exposed CNTs can additionally or alternatively be removed by washing (e.g., using mechanical forces from a washing fluid to remove the CNTs) and/or any other suitable removal processes.

S140 can additionally or alternatively include removing the unexposed CNTs (e.g., second CNT population, CNTs near the second mask portion and/or not near the first mask portion, etc.). For example, S140 can include delaminating the remaining mask from the substrate (e.g., peeling the mask off the substrate), wherein the unexposed CNTs remain embedded in the remaining mask and are thereby removed from the substrate. These CNTs can, for example, subsequently be transferred to a different substrate and/or used in any other suitable manner.

However, S140 can additionally or alternatively include removing any suitable carbon nanotubes in any suitable manner.

3.5 Removing the Remaining Mask.

Removing the remaining mask S150 preferably functions to expose the purified CNTs (e.g., the CNTs still on the substrate, such as the second CNT population). Such exposure can enable, for example: transferring the purified CNTs (e.g., onto and/or into an electronic device), such as transferring multiple batches of purified CNTs (e.g., to achieve a high CNT density); device fabrication (e.g., incorporating the CNTs, such as fabricating on top of the purified CNT bed); packaging and/or use of a finished device (e.g., finished after addition of the CNTs); and/or any other suitable use of the purified CNTs.

S150 preferably includes causing the remaining mask to decompose, analogous to the decomposition of portions of the mask in S130 (e.g., using the same stimulus to cause depolymerization of the stimulus-responsive polymer). For example, S150 can include heating the mask (e.g., by heating the entire substrate, such as on a hot plate and/or in an oven) to a temperature greater than its decomposition temperature, thereby causing the mask to depolymerize. Such a removal technique can be beneficial for several reasons. For example, it can result in little or substantially no residue from the mask remaining on the CNTs and/or substrate, it can be performed as a dry (liquid-free) process, and/or can be easily performed at large scale (e.g., concurrently for the entire substrate and/or multiple substrates).

S150 can additionally or alternatively include removing the remaining mask by dissolving the mask (e.g., in a chemical solvent), etching the mask (e.g., using an dry and/or wet etching process that selectively etches the mask and not the CNTs), delaminating (e.g., peeling) the mask from the substrate (e.g., wherein the CNTs remain on the substrate, rather than being retained within the mask), and/or removing the remaining mask in any other suitable manner.

4. Specific Example

In one example, the method 100 is performed to purify a substantially aligned monolayer bed of CNTs supported on a substrate. The mask is deposited S120 by coating the CNT bed with an approximately 10 nm thick layer of one or more self-immolative polymers (e.g., by spin coating a solution of the polymer(s) dissolved in one or more solvents). After mask deposition, the entire CNT bed is illuminated with one or more wavelength bands (e.g., approximately 750 nm wide) within the 2-4 micron range and/or the 600-750 nm range, thereby selectively heating the metallic CNTs more than the semiconducting CNTs, which causes trenches (e.g., approximately 10 nm wide trenches) to form in the mask above the metallic CNTs and not above the semiconducting CNTs (as the mask depolymerizes in the vicinity of the heated metallic CNTs). After illumination, the exposed (metallic) CNTs are etched in an oxygen plasma. After exposed CNT etching, the remaining polymer mask is removed by heating the substrate above the decomposition temperature (e.g., for a 140° C. decomposition temperature, heating to approximately 200° C.), thereby exposing the purified semiconductor CNTs.

In a second example, the method 100 is performed to purify a substantially aligned monolayer bed of CNTs supported on a substrate. The mask is deposited S120 by coating the CNT bed with an approximately 10 nm thick layer of one or more self-immolative polymers (e.g., by spin coating a solution of the polymer(s) dissolved in one or more solvents). After mask deposition, the entire CNT bed is illuminated with one or more wavelength bands (e.g., approximately 750 nm wide) within the 0.8-2 micron range, thereby selectively heating the semiconducting CNTs more than the metallic CNTs, which causes trenches (e.g., approximately 10 nm wide trenches) to form in the mask above the semiconducting CNTs and not above the metallic CNTs (as the mask depolymerizes in the vicinity of the heated semiconducting CNTs). After illumination, the exposed (semiconducting) CNTs are etched in an oxygen plasma. After exposed CNT etching, the remaining polymer mask is removed by heating the substrate above the decomposition temperature (e.g., for a 140° C. decomposition temperature, heating to approximately 200° C.), thereby exposing the purified metal CNTs.

However, the method 100 can additionally or alternatively include any other suitable elements performed in any suitable manner.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems and/or methods according to preferred embodiments, example configurations, and variations thereof. It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for carbon nanotube purification, comprising:
    coating a bed of carbon nanotubes with a polymer mask comprising a self-immolative polymer, the bed comprising a first population of carbon nanotubes and a second population of carbon nanotubes, wherein the polymer mask comprises:
        a first portion coating the first population and not the second population; and
        a second portion coating the second population and not the first population;
    selectively depolymerizing the first portion of the polymer mask and not the second portion of the polymer mask, comprising illuminating the bed of carbon nanotubes with light, wherein the light is more strongly absorbed by the first population than by the second population, thereby heating the first portion of the polymer mask;
    after depolymerizing the first portion of the polymer mask, selectively removing the first population of carbon nanotubes and not the second population of carbon nanotubes, wherein the second portion of the polymer mask protects the second population during removal of the first population; and
    after selectively removing the first population of carbon nanotubes, removing the second portion of the polymer mask from the bed of carbon nanotubes.

2. The method of claim 1, wherein:
    the first population consists essentially of metallic carbon nanotubes; and
    the second population consists essentially of semiconducting carbon nanotubes.

3. The method of claim 2, wherein, after selectively removing the first population of carbon nanotubes, a metallic/semiconducting ratio of the bed of carbon nanotubes is less than 0.001.

4. The method of claim 1, wherein the carbon nanotubes of the bed are arranged substantially in a single monolayer or partial monolayer.

5. The method of claim 4, wherein substantially all carbon nanotubes of the bed are arranged substantially parallel to each other.

6. The method of claim 1, wherein the polymer mask comprises at least one of: poly(N-isopropyl acrylamide), poly(N-ethylpyrrolidine methacrylate), poly(phthalaldehyde), poly(4,5-dichlorophthalaldehyde), poly(methyl glyoxylate), poly(carbamate), polyurethane, polycarbonate, or poly(benzyl ether).

7. The method of claim 1, wherein a thickness of the polymer mask is less than 30 nm.

8. The method of claim 1, wherein illuminating the bed of carbon nanotubes with light comprises: illuminating the carbon nanotubes with light defining a wavelength bandwidth of more than 25 nm.

9. The method of claim 1, wherein removing the first population of carbon nanotubes comprises exposing the first population of carbon nanotubes and the second portion of the polymer mask to an etchant environment.

10. The method of claim 1, wherein the bed of carbon nanotubes is supported by a substrate, wherein the substrate is substantially transparent to the light.

11. The method of claim 1, wherein:
    the first population consists essentially of semiconducting carbon nanotubes; and
    the second population consists essentially of metallic carbon nanotubes.

12. A method for carbon nanotube purification, comprising:
    coating a substantially aligned bed of carbon nanotubes with a polymer mask comprising a self-immolative polymer, the bed comprising semiconducting carbon nanotubes and metallic carbon nanotubes, wherein the polymer mask comprises:
        a first portion coating the metallic carbon nanotubes and not the semiconducting carbon nanotubes; and
        a second portion coating the semiconducting carbon nanotubes and not the metallic carbon nanotubes;
    selectively depolymerizing the first portion of the polymer mask and not the second portion of the polymer mask, comprising selectively heating the metallic carbon nanotubes more than the semiconducting carbon nanotubes, thereby heating the first portion of the polymer mask; and
    after depolymerizing the first portion of the polymer mask, selectively etching the metallic carbon nanotubes and not the semiconducting carbon nanotubes, wherein the second portion of the polymer mask protects the semiconducting carbon nanotubes during etching.

13. The method of claim 12, wherein selectively heating the metallic carbon nanotubes and not by the semiconducting carbon nanotubes comprises: illuminating the carbon nanotubes with light, wherein the light is more strongly absorbed by the first population than by the second population.

14. The method of claim 13, wherein illuminating the bed of carbon nanotubes with light comprises: illuminating the carbon nanotubes with light emitted by a broadband light source.

15. The method of claim 13, wherein illuminating the bed of carbon nanotubes with light comprises: illuminating the carbon nanotubes with light defining a wavelength between 600 nanometers and 750 nanometers.

16. The method of claim 12, wherein selectively heating the metallic carbon nanotubes and not by the semiconducting carbon nanotubes comprises: applying a voltage bias across the length of the bed of carbon nanotubes, thereby causing current to flow through the metallic carbon nanotubes.

17. The method of claim 12, wherein the carbon nanotubes of the bed are arranged substantially in a single monolayer or partial monolayer.

18. The method of claim 12, further comprising, after selectively etching the metallic carbon nanotubes, removing the second portion of the polymer mask from the bed of carbon nanotubes such that substantially no polymer mask remains on the bed of carbon nanotubes.

19. The method of claim 18, wherein removing the second portion of the polymer mask from the bed of carbon nanotubes comprises depolymerizing the polymer mask by heating the polymer mask.

20. The method of claim 12, wherein, after depolymerizing the first portion of the polymer mask, the polymer mask defines a plurality of troughs exposing the metallic carbon nanotubes, wherein each trough defines a width between 0.5 nm and 10 nm.

21. A method for carbon nanotube purification, comprising:
- coating a bed of carbon nanotubes with a polymer mask comprising a self-immolative polymer, the bed comprising a first population of carbon nanotubes and a second population of carbon nanotubes, wherein the polymer mask comprises:
  - a first portion coating the first population and not the second population; and
  - a second portion coating the second population and not the first population;
- selectively depolymerizing the first portion of the polymer mask and not the second portion of the polymer mask, comprising selectively heating the first population more than the second population, thereby heating the first portion of the polymer mask; and
- after depolymerizing the first portion of the polymer mask, selectively etching the first population of carbon nanotubes and not the second population of carbon nanotubes, wherein the second portion of the polymer mask protects the second population during etching; and
- after selectively etching the first population of carbon nanotubes, removing the second portion of the polymer mask from the bed of carbon nanotubes.

\* \* \* \* \*